(12) United States Patent
Montemurro et al.

(10) Patent No.: US 8,948,027 B2
(45) Date of Patent: Feb. 3, 2015

(54) METHOD AND SYSTEM FOR WIRELESS NETWORK MANAGEMENT

(75) Inventors: Michael Montemurro, Toronto (CA); Roger Durand, Amherst, NH (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 12/355,611

(22) Filed: Jan. 16, 2009

(65) Prior Publication Data
US 2010/0182915 A1 Jul. 22, 2010

(51) Int. Cl.
*H04J 3/14* (2006.01)
*H04W 24/10* (2009.01)
*H04W 88/06* (2009.01)
*H04W 84/12* (2009.01)

(52) U.S. Cl.
CPC .............. *H04W 24/10* (2013.01); *H04W 88/06* (2013.01); *H04W 84/12* (2013.01); *Y10S 370/913* (2013.01)
USPC ............................ 370/252; 370/913; 370/332

(58) Field of Classification Search
None
See application file for complete search history.

(56) References Cited

U.S. PATENT DOCUMENTS

| | | | |
|---|---|---|---|
| 6,154,655 A | 11/2000 | Borst et al. | |
| 6,415,146 B1 | 7/2002 | Capece | |
| 7,113,793 B2* | 9/2006 | Veerasamy et al. | 455/456.1 |
| 7,447,176 B2* | 11/2008 | Ruan et al. | 370/331 |
| 7,627,338 B2* | 12/2009 | Hicks et al. | 455/552.1 |
| 7,742,739 B2* | 6/2010 | Diaz Cervera et al. | 455/11.1 |
| 7,805,136 B1* | 9/2010 | Everson et al. | 455/423 |
| 2001/0009853 A1* | 7/2001 | Arimitsu | 455/434 |
| 2002/0009992 A1 | 1/2002 | Jensen | |
| 2005/0136941 A1* | 6/2005 | Asho et al. | 455/456.1 |
| 2005/0276276 A1* | 12/2005 | Davis | 370/447 |
| 2006/0203743 A1* | 9/2006 | Quinn et al. | 370/254 |
| 2006/0218271 A1* | 9/2006 | Kasslin et al. | 709/224 |
| 2006/0223557 A1 | 10/2006 | Manohar | |
| 2007/0038519 A1* | 2/2007 | Johansson et al. | 705/26 |
| 2007/0049276 A1 | 3/2007 | Rimoni et al. | |
| 2008/0031172 A1 | 2/2008 | Nanda et al. | |
| 2008/0119187 A1* | 5/2008 | Gallagher et al. | 455/436 |
| 2008/0253314 A1* | 10/2008 | Stephenson et al. | 370/326 |
| 2009/0228598 A1* | 9/2009 | Stamoulis et al. | 709/230 |
| 2009/0252134 A1* | 10/2009 | Schlicht et al. | 370/338 |

(Continued)

FOREIGN PATENT DOCUMENTS

| | | |
|---|---|---|
| AU | 2009337113 | 7/2010 |
| CN | 1473418 A | 2/2004 |

(Continued)

OTHER PUBLICATIONS

"International Application Serial No. PCT/US2009/003344, Written Opinion mailed Oct. 5, 2009".

(Continued)

*Primary Examiner* — Huy D Vu
*Assistant Examiner* — Zewdu A Beyen
(74) *Attorney, Agent, or Firm* — Brinks Gilson & Lione (57) ABSTRACT

Methods and systems for wireless network management are described. In one embodiment, a radio measurement of a characteristic of a wireless access technology may be taken. The wireless access technology may enable data communication through a wireless network when connected to an access point. A report may be transmitted through an alternate access technology. The report may be based on the radio measurement. Additional methods and systems are disclosed.

20 Claims, 11 Drawing Sheets

(56) References Cited

U.S. PATENT DOCUMENTS

| | | | |
|---|---|---|---|
| 2009/0276475 A1* | 11/2009 | Ramsey et al. ............... | 707/204 |
| 2010/0064005 A1 | 3/2010 | Amaya et al. | |

FOREIGN PATENT DOCUMENTS

| | | |
|---|---|---|
| CN | 101253715 A | 8/2008 |
| DE | 20310113 | 12/2003 |
| EP | 1 838 040 | 9/2007 |
| JP | 11-331929 A | 11/1999 |
| JP | 2001-197538 A | 7/2001 |
| JP | 2003-259024 A | 9/2003 |
| JP | 2004242259 A1 | 8/2004 |
| JP | 2001008256 A2 | 5/2006 |
| JP | 200811573 A2 | 1/2008 |
| JP | 2010-502090 A | 1/2010 |
| WO | WO 02/21778 | 3/2002 |
| WO | 2006056882 A1 | 6/2006 |
| WO | WO-2006056882 A1 | 6/2006 |
| WO | 2007029109 A2 | 3/2007 |
| WO | 2007144961 A1 | 12/2007 |
| WO | 2008020729 A1 | 2/2008 |

OTHER PUBLICATIONS

"International Application Serial No. PCT/US2009/003344, Search Report mailed Oct. 5, 2009".

EP Exam Report; Date: Apr. 4, 2012; Application No. 09788790.5; pp. 6; Applicant: Research in Motion Limited.

English translation of Mexico Office Action; Date: Jun. 15, 2012; Application No. MX/a/2011/006705; pp. 4; Applicant: Research in Motion Limited.

Korean Office Action, corresponding Application No. 10-2011-7017136; pp. 7; dated Sep. 25, 2012.

Korean Office Action, corresponding Application No. 10-2011-7017136, pp. 6, dated Mar. 27, 2013.

Australian Office Action, corresponding Application No. 2009337113, pp. 4, dated Feb. 25, 2013.

Chinese Office Action, corresponding Application No. 200980154529.6; pp. 26; dated May 29, 2013.

Japanese Office Action mailed Aug. 27, 2013 for related Japanese Application No. 2011-546235.

Notice of Allowance delivered Oct. 1, 2013 for related Korean Application No. 10-2011-7017136.

Canadian Office Action dated Aug. 20, 2013 for related Canadian Application No. 2,747,855.

Mexican Office Action, corresponding Application No. MX/a/2011/006705; pp. 6; dated Mar. 7, 2013.

Japanese Office Action, corresponding Application No. 2011-546235, pp. 7, dated Apr. 18, 2013.

Office Action (and English Translation) dated Jan. 28, 2014 for corresponding Chinese Application No. 200980154529.6, 23 pages.

Office Action dated Mar. 12, 2014 for corresponding Canadian Application No. 2,747,855, 4 pages.

Notice of Allowance dated Dec. 17, 2013 for corresponding Japanese Application No. 2011-546235, 3 pages.

Notice of Intent to Grant dated Nov. 28, 2013 for corresponding European Application No. 09788790.5, 5 pages.

Office Action in Chinese dated Jan. 28, 2014 for corresponding Chinese Application No. 200980154529.6, 10 pages.

Office Action in Spanish dated Nov. 22, 2013 for corresponding Mexican Application No. MX/a/2011/006705, 3 pages.

Extended European Search Report issued in corresponding case EP 14161396.8—1857, dated Apr. 25, 2014, pp. 1-7.

Office Action issued in corresponding case MX/a/2011/006705, dated Apr. 29, 2014, pp. 1-2.

Office Action issued in corresponding case CN 200980154529.6, dated Jul. 3, 2014, pp. 1-15.

* cited by examiner

METHOD AND SYSTEM FOR WIRELESS NETWORK MANAGEMENT

FIELD

This application relates to methods and systems for wireless network management, and more specifically to methods and systems for sending or receiving communications regarding a wireless access technology using a alternate access technology.

BACKGROUND

A mobile electronic device may have network connectivity when in communication with an access point of a wireless network. To connect to the access point, the mobile electronic device uses a wireless access technology such as wireless local area network (LAN).

To extend the capability, reliability, and maintainability of the wireless network, the mobile electronic device, the access point, or both may make radio measurements of one or more characteristics of the wireless access technology. Certain applications may use these radio measurements in order to attain an appropriate or expected level of performance. These applications include voice over Internet Protocol (VOIP), video over IP, location based applications, as well as applications that mitigate harsh or hostile radio environments (e.g., multifamily dwellings, airplanes, factories, or municipalities).

The radio measurements are then reported to recipients by transmitting reports. The reports are transmitted through the same wireless access technology on which the radio measurements were taken. However, in particular environments, it may not be possible for the radio measurements to be received through the same wireless access technology by a recipient.

DETAILED DESCRIPTION

Example methods and systems for wireless network management are described. In the following description, for purposes of explanation, numerous specific details are set forth in order to provide a thorough understanding of example embodiments. It will be evident, however, to one of ordinary skill in the art that embodiments of the invention may be practiced without these specific details.

A station in the form of a mobile electronic device or access point may take a radio measurement of a wireless access technology. The wireless access technology enables data communication through a wireless network when the mobile electronic device is in communication with an access point, or the access point is in communication with another access point. The station then transmits a report regarding the wireless access technology through an alternate access technology to a recipient of the report.

The recipient of the report regarding the wireless access technology may identify a network problem with the wireless network based on the report. Once the network problem is identified, the recipient may alter connectivity to the wireless network through the wireless access technology. The recipient may transmit a notification to other mobile electronic devices of the wireless network based on the report, identification of the network problem, or both. The recipient may receive and retransmit the report to one or more other devices on the network.

When desired, diagnostics may be run on the wireless network associated with the wireless access technology. A diagnostic report may then be generated and transmitted to a network manager associated with the wireless network through an alternate access technology.

Figure 1:
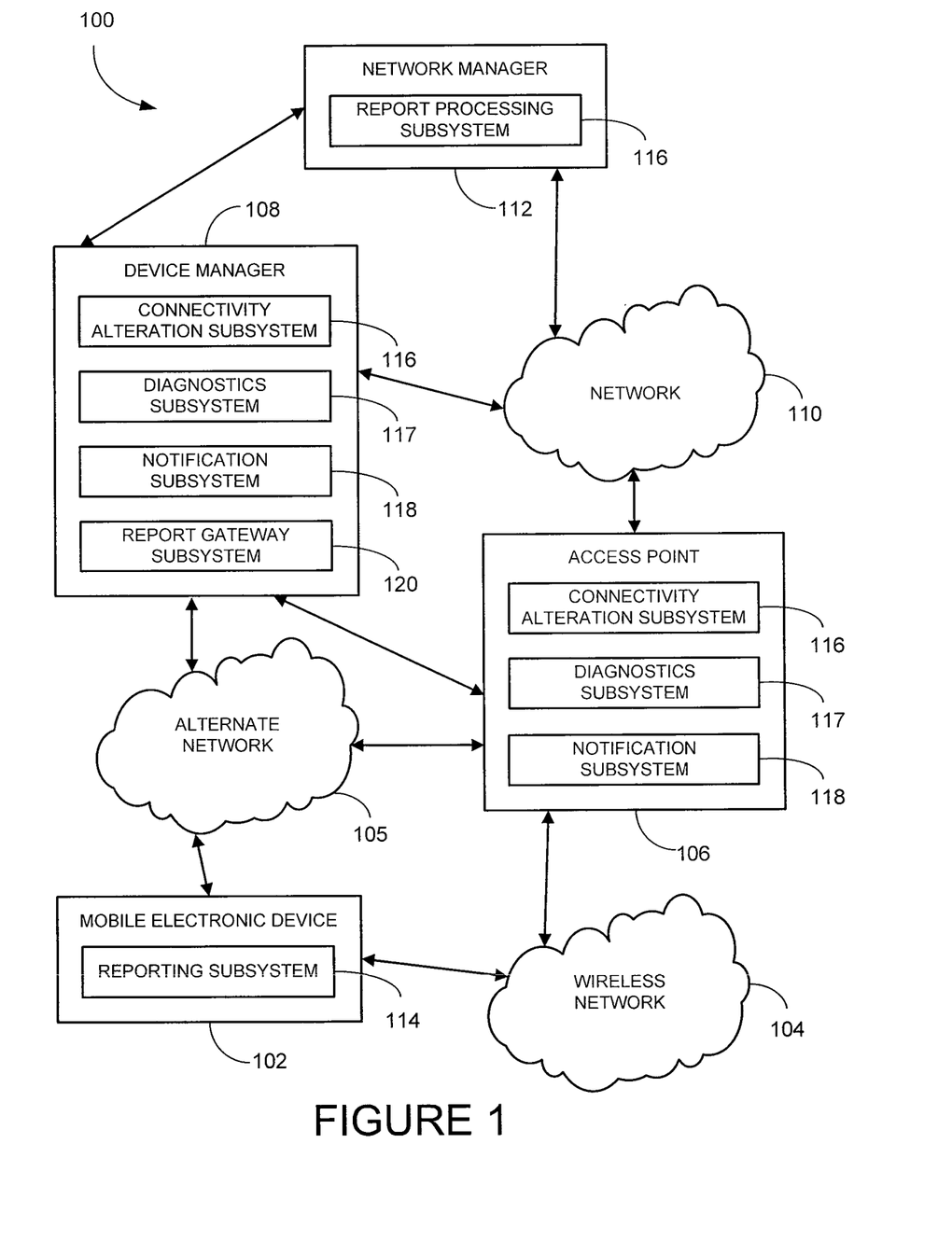
FIG. 1 is a block diagram of a system, according to an example embodiment.

FIG. 1 illustrates an example system 100 in which a mobile electronic device 102 may attempt to communicate through a wireless access technology with an access point 106 of a wireless network 104. When in communication, the access point 106 provides the mobile electronic device 102 with network connectivity. When access to the wireless network 104 is not possible, the mobile electronic device 102 may attempt to obtain network connectivity through a different wireless access technology of an alternate network 105.

The mobile electronic device 102 is a portable electronic device that enables a user to send and receive data, communicate with others through voice communications or otherwise, or both. In one embodiment, the mobile electronic device 102 may be any device capable of using the 802.11 protocol to communicate. A number of additional mobile electronic devices associated with other users may also be in communication with the wireless network 104 through the access point 106 or additional access points.

The access point 106 and additional access points are devices that, when in communication with the mobile electronic device 102, enable access to network connectivity through the wireless network 104. For example, the proximity of a particular access point to the mobile electronic device 102 is typically a factor in determining which access point will seek to provide the mobile electronic device 102 with network connectivity.

At least some of the mobile electronic devices and the access points of the system 100 may take one or more radio measurements of characteristics of a wireless access technology that is providing or could provide communication through the wireless network 104. A report based on radio measurements may be transmitted to and received by other devices of the system 100. In certain situations, the report is not transmitted through the wireless access technology, but rather is transmitted through an alternate access technology that is different from the wireless access technology.

The mobile electronic devices and the access points need not receive network connectivity through the wireless access technology (e.g., by being connected to the access point 106) to take a radio measurement of a characteristic of the wireless access technology, to transmit reports, or both. The mobile electronic devices and the access points may therefore each be considered an independent and intelligent autonomous entity. In one embodiment, the inclusion of the functionality to take the measurements and transmit reports via the alternate access technology may be used when the mobile electronic device 102 loses a connection to the access point 106 while taking the measurements (e.g., problems occur in polluted bands) or is not connected to the access point 106.

In one particular embodiment, the wireless access technology is wireless local area network (LAN). Examples of wireless LAN include Wi-Fi, WiMax, or Bluetooth.

The alternate access technology may include, by way of example a wireless wide area network (WAN), a wireless metropolitan area network (MAN), a wireless regional area network (RAN), or the like. In one particular embodiment, the alternate access technology is an additional wireless LAN. In another particular embodiment, the alternate access technology is a wired connection.

In some embodiments, the alternate access technology is used at a delay (e.g., when the mobile electronic device is ultimately able to obtain connectivity through the alternate network 105). In other embodiments, the alternate network 105 is readily available and the data is sent through the alternate access technology without delay.

One potential recipient of the report is a device manager 108. In the system 100, the device manager 108 is shown as a device that manages the mobile electronic devices 102 and additional mobile electronic devices. For example, the device manager 108 may provide an electronic mail forwarding service for a number of mobile electronic devices including the mobile electronic device 102. The management performed by an entity associated with the device manager 108 may involve one or more device related activities including, by way of example, device development, device implementation, device launch, device sale, device branding, device management, or the like. In one embodiment, the entity associated with the device manager 108 uses received reports as a basis for improving existing devices of the device manager 108, or as a basis for improving the design or functionality of future devices.

Another potential recipient of the report is a network manager 112. The network manager 112 is shown in the system 100 as a device that manages the wireless network 104. In one embodiment, the network manager 112 seeks to identify and resolve a network problem effecting quality of service (e.g., data rates or connectivity to the wireless network 104). Examples of the network manager 112 include switches and controllers. The device manager 108 and the network manager 112 may be operated by a same entity or different entities.

In some embodiments, the access point 106, the device manager 108, and the network manger 112 are in communication over a network 110. Data that has been requested by the mobile electronic device 102 and is outside of the system 100 may be received through the network 110.

A number of subsystems 114-120 are shown in FIG. 1 as being deployed in various elements of the system 100 to provide functionality to their respective devices. However, in some embodiments, a lesser number of subsystems may be deployed in particular devices. For example, some devices of the system 100 may not include any of the subsystems 114-120 in certain embodiments. The underlying modules of multiple subsystems may, in some embodiments, be combined into a single subsystem in some of the devices.

A reporting subsystem 114, when deployed in the mobile electronic device 102, takes one or more radio measurements of characteristics of the wireless access technology associated with the wireless network 104. The wireless access technology enables the mobile electronic device 102 to have data communication through the wireless network 104 when connected to one of the access points (e.g., the access point 106). A report based on the radio measurement is then ultimately not transmitted through the wireless access technology and received by the access point 106, the device manager 108, or the network manager 112. Rather, the report is transmitted by the reporting subsystem 114 through the alternate access technology that is different from the wireless access technology.

The radio measurements are the result of the reporting subsystem 114 of the mobile electronic device 102 tuning to a specific frequency with a specific bandwidth or frequency channel. A radio of the reporting subsystem 114 then listens on the channel and attempts to sense the Ether or free space for the presence of energy. The radio then measures and may, in one embodiment, internally record that energy relative to an antenna of the radio component. If no signal energy is present, the radio may measure and record the radio noise floor or attempt to characterize noise like behavior. The reporting subsystem 114 then attempts to identify and demodulate the energy to determine if signal energy is present. The results of the successes and failures may be internally recorded. The reporting subsystem 114 then demodulates the information contained within the signal energy. The resulting information may then be recorded. These radio measurements relative to demodulated information will give the radio of the mobile electronic device 102 awareness of the area in which it can presently hear. These radio measurements may be made as individual measurements or could be processed through a data collection routine. These radio measurements may include a time stamp or have a time stamp added to them by the reporting subsystem 114.

The radio measurements made by the reporting subsystem 114 that are noise energy related may include one or more of the following measurements: average, peak, minimum, actual-radio noise floor power without detecting interference; average, peak, minimum, actual-radio noise floor power while detecting interference; and temporal/duration information of the radio noise floor power while detecting interference.

The radio measurements made by the reporting subsystem 114 that are signal energy related may include one or more of the following measurements: average, peak, minimum, and actual radio signal power without detecting interference; average, peak, and minimum radio signal power while detecting interference (of the signal); and temporal/duration information of the radio signal power while detecting interference (of the signal).

The radio measurements made by the reporting subsystem 114 that are network or network awareness related may include one or more of the following measurements: error/s, success/s, report/s, network load, Ether occupancy time, time related information, neighborhood information (e.g., other access points it can sense), network identifier information (SSIDs/BSSIDS—single or multiple), security configuration, security errors, security attacks/alarms and countermeasures, location information, transmitter power output configuration of the radio it senses and/or its own transmitter power output configuration, class of service related information, quality of service related information, available admission capacity information, diagnostic related information, test related information, traffic generation information, sleep mode configuration information, antenna configuration, multiple input and multiple output (MIMO) radio configurations and capabilities, times to reconfigure, times to roam from one network to another, or the like. Other characteristics of the wireless access technology may also be made.

A connectivity alteration subsystem 116 may be deployed in the access point 106, the device manager 108, or both. The connectivity alteration subsystem 116 alters connectivity to the wireless network 104 through the wireless access technology based on identification of a network problem with the wireless network 104.

A diagnostics subsystem 117 may be deployed in the access point 106, the device manager 108, or both. The diagnostics subsystem 117 generates a diagnostic report based on running diagnostics on the wireless network 104. The diagnostic report may then be transmitted to and used by the network manager 112 to resolve problems, or the report may be otherwise used to improve the wireless network 104.

When the notification subsystem 118 is deployed in the device manager 108, additional mobile electronic devices may be notified of a report regarding a wireless access technology or network problem based on a radio measurement taken by the electronic mobile device 102.

The report gateway subsystem 120 retransmits a report received from the mobile electronic device 102 to the access point 106, the network manager 112, or both the access point 106 and the network manager 112.

Figure 2:
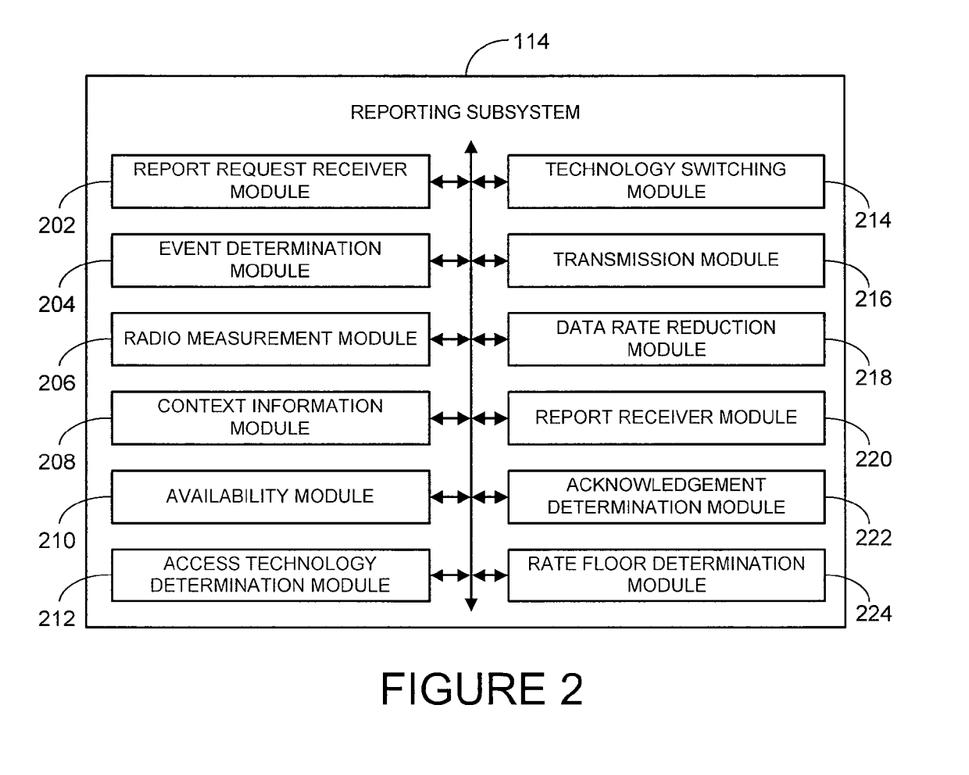
FIG. 2 is a block diagram of an example reporting subsystem that may be deployed within the system of FIG. 1, according to an example embodiment.

FIG. 2 illustrates an example reporting subsystem 114 that may be deployed in the mobile electronic device 102, the access point 106, or otherwise deployed in another system. One or more modules are included in the reporting subsystem 114 to enable reporting. The modules of the reporting subsystem 114 may include a report request receiver module 202, an event determination module 204, a radio measurement module 206, a context information module 208, an availability module 210, an access technology determination module 212, a technology switching module 214, a transmission module 216, a data rate reduction module 218, a report receiver module 220, an acknowledgement determination module 222, and a rate floor determination module 224. Other modules may also be included.

A report request may be received by the report request receiver module 202. In some embodiments, the report request may include notification regarding availability of the alternate access technology. The notification may be included in a subelement of a request defined by IEEE 802.11k-2008 or P802.11v. In one particular embodiment, the notification includes a uniform resource locator (URL) associated with the alternate access technology. In other embodiments, the URL or other type of notification is provisioned on the device (e.g., the mobile electronic device 102 or the access point 106) as part of the network configuration to enable connectivity through the alternate access technology. For example, the network configuration may include a service set identifier (SSID), security credentials, and the URL.

In some embodiments, an occurrence of an event may be determined by the event determination module 204. The event may be a device event, a network event, or the like. One or more radio measurement of characteristics of a wireless access technology may be taken by the radio measurement module 206. In one embodiment, the radio measurement may be taken in response to the report request receiver module 202. In another embodiment, the radio measurement may be taken in response to a determination by the event determination module 204 that an occurrence of an event has happened.

In some embodiments, context information on the taking of the radio measurement is ascertained by the context information module 208. The context information may relate to how or where the radio measurement was made by the radio measurement module 206.

When provided in the reporting subsystem 114, the availability module 210 discovers availability of the alternate access technology or receives an indication of availability of the alternate access technology.

A determination of whether to transmit a report based on radio measurements through the wireless access technology or the alternate access technology is made by the access technology determination module 212 in one particular embodiment. The determination may be made based on whether certain conditions are met.

Depending on the device in which the reporting subsystem 114 is deployed, the technology switching module 214 may be included to disable access to the wireless access technology and enables access to the alternate access technology. In other devices, the transmission of the report through the alternate access technology may be performed while the wireless access technology is active. The performance may be based on the device being a dual mode device.

A report is transmitted through the alternate access technology by the transmission module 216 based on one or more radio measurements taken on the wireless access technology and, in some embodiments, the context information. The report may be transmitted through the alternate access technology to the access point 106, the network manager 112, or the device manager 108. The alternate access technology may therefore act as an alternate transportation mechanism to transmit the report to a desired recipient.

In some embodiments, the transmission module 216 may first attempt to transmit the report through the wireless access technology to the access point 106, or may first transmit data to the access point 106 at a data rate through the wireless access technology. Such transmissions of the report may be a precursor to transmitting the report through the alternate access technology.

In one embodiment, the particular additional access point in which the reporting subsystem 114 is deployed transmits the report to the access point 106. The transmitted report may be a neighbor report, or may be in a different format.

Prior to using the alternate access technology, in some embodiments a data rate is reduced by the data rate reduction module 218 based on a determination that the transmission acknowledgement was not received from the access point 106. The data rate reduction may be an attempt to still transmit the data (e.g., a report or other data preceding the report) over the wireless access technology.

In one particular embodiment, availability of the alternate access technology is provisioned (e.g., on the mobile electronic device 102 or the access point 106) prior to transmission of the report by the transmission module 216.

The report receiver module 220 may be used to determine whether the access point 106 has received the report. A determination of whether a transmission acknowledgement was received from the access point 106 may be made by the acknowledgement determination module 222.

In one particular embodiment, the rate floor determination module 224 determines whether the lower data rate is below a rate floor. Once the lower data rate is below the rate floor, the transmission module 216 transmits the report based on the wireless access technology through the alternate access technology instead of the wireless access technology.

Figure 3:
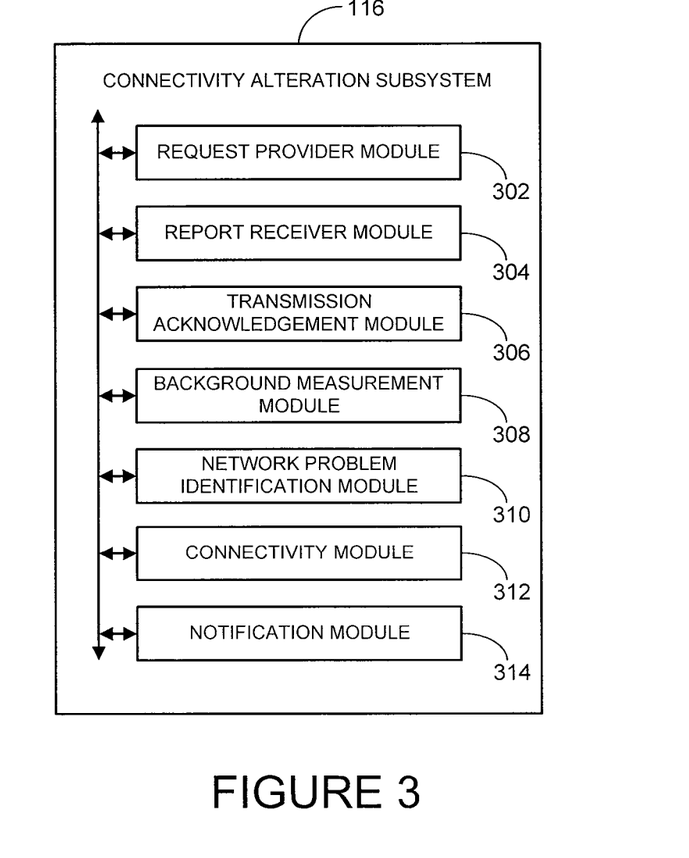
FIGS. 3 and 4 are block diagrams of example report processing subsystems that may be deployed within the system of FIG. 1, according to example embodiments.

FIG. 3 illustrates an example connectivity alteration subsystem 116 that may be deployed in the access point 106, the network manager 112, or both of the system 100 (see FIG. 1), or otherwise deployed in another system. One or more modules are included in the connectivity alteration subsystem 116 to enable report processing. The modules of the connectivity alteration subsystem 116 may include a request provider module 302, a report receiver module 304, a transmission acknowledgement module 306, a background measurement module 308, a network problem identification module 310, a connectivity module 312, and a notification module 314. Other modules may also be included.

A report request is transmitted to the mobile electronic device 102 by the request provider module 302. The report request prompts the mobile electronic device 102 to take one or more radio measurements of the wireless access technology.

A report regarding the wireless access technology is received by the report receiver module 304 from the mobile electronic device 102 through the alternate access technology. The received report may be a report response that is received in response to the report request transmitted by the request provider module 302. In one embodiment, the report received by the access point 106 or the network manager 112 is from the mobile electronic device 102. In another embodiment, the report is received by the access point 106 from the network manager 112.

In some embodiments, an acknowledgement may be transmitted to the mobile electronic device 102 by the transmission acknowledgement module 306 based on receipt of the report.

In certain embodiments, one or more background measurements of the wireless network 104 are taken by the background measurement module 308. An example background measurement is determining the presence of radar overlapping the wireless network 104.

A network problem with the wireless network 104 may be identified by the network problem identification module 310 based on the report, the background measurement, or both. The network problem may be a result of bad reception, interference from a microwave, a wall, other wireless technology, or the like.

Connectivity to the wireless network 104 through the wireless access technology may be made or altered by connectivity module 312 based on identification of the network problem. The alteration may include, by way of example, adding one or more access points to the wireless network 104, increasing or decreasing the transmit power of the access point 106, and the like.

In some embodiments, a notification may be transmitted by the notification module 314 to the additional mobile electronic devices regarding the network problem, status of the wireless network 104, status of the access points, and the like.

Figure 4:
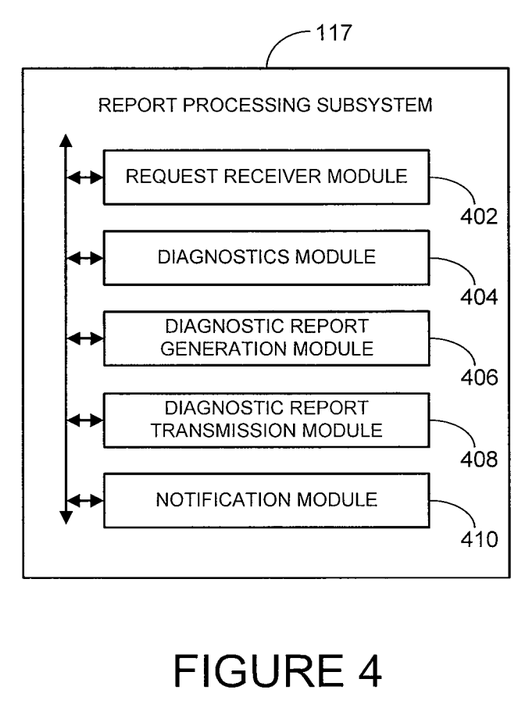

FIG. 4 illustrates an example diagnostics subsystem 117 that may be deployed in the access point 106 or the device manager 108 of the system 100 (see FIG. 1), or otherwise deployed in another system. One or more modules are included in the diagnostics subsystem 117 to enable diagnostic reporting. The modules of the diagnostics subsystem 117 may include a request receiver module 402, a diagnostics module 404, a diagnostic report generation module 406, a diagnostic report transmission module 408, and a notification module 410. Other modules may also be included.

A diagnostic report request is received by the request receiver module 402. The diagnostics module 404 runs diagnostics on the wireless network 104 associated with the wireless access technology. The running of the diagnostics on the wireless network 104 may be based on receipt of the diagnostic report request.

The diagnostic report generation module 406 generates a diagnostic report based on running the diagnostics. The diagnostic report may then be transmitted to the network manager 112 by the diagnostic report transmission module 408 through the alternate access technology. In some embodiments, a notification is transmitted to the additional mobile electronic devices by notification module 410 based on running the diagnostics.

Figure 5:
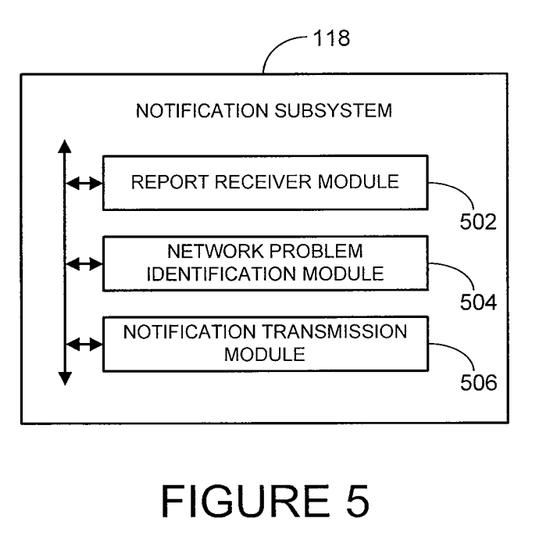
FIG. 5 is a block diagram of an example notification subsystem that may be deployed within the system of FIG. 1, according to an example embodiment.

FIG. 5 illustrates an example notification subsystem 118 that may be deployed in the access point 106, the device manager 108, or both the access point 106 and the device manager 108 of the system 100 (see FIG. 1), or otherwise deployed in another system. One or more modules are included in the notification subsystem 118 to enable transmissions of notifications. The modules of the notification subsystem 118 may include a report receiver module 502, a network problem identification module 504, and a notification transmission module 506. Other modules may also be included.

A report is received by the report receiver module 502 from the mobile electronic device 102 regarding the wireless access technology through the alternate access technology. In some embodiments, a network problem in the wireless network 104 is then identified by the network problem identification module 504 based on the report.

A notification may then be transmitted to the additional mobile electronic devices by the notification transmission module 506 based on the report, the network problem, or both. The notification may be transmitted to the additional mobile electronic devices through the wireless access technology, through the alternate access technology, both the wireless access technology and the alternate access technology, or may be otherwise provided. The notification may include a low network priority for the wireless network 104 associated with the wireless access technology.

Figure 6:
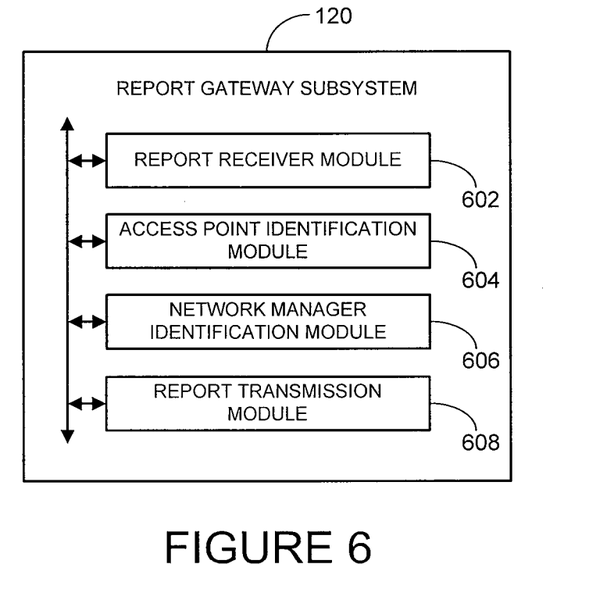
FIG. 6 is a block diagram of an example report gateway subsystem that may be deployed within the system of FIG. 1, according to an example embodiment.

FIG. 6 illustrates an example report gateway subsystem 120 that may be deployed in the device manager 108 of the system 100 (see FIG. 1), or otherwise deployed in another system. One or more modules are included in the report gateway subsystem 120 to enable retransmissions of reports. The modules of the report gateway subsystem 120 may include a report receiver module 602, an access point identification module 604, a network manager identification module 606, and a report transmission module 608. Other modules may also be included.

A report regarding the wireless access technology is received by the report receiver module 602 from the mobile electronic device 102 through the alternate access technology.

The access point 106 associated with the report is then identified by the access point identification module 604. In some embodiments, the network manager 112 associated with the access point 106 is identified by the network manager identification module 606.

The report is then transmitted by the report transmission module 608 based on identification of the access point 106, the network manager 112, or both the access point 106 and the network manager 112. The report may be transmitted through a data tunnel, or may be transmitted otherwise.

Figure 7:
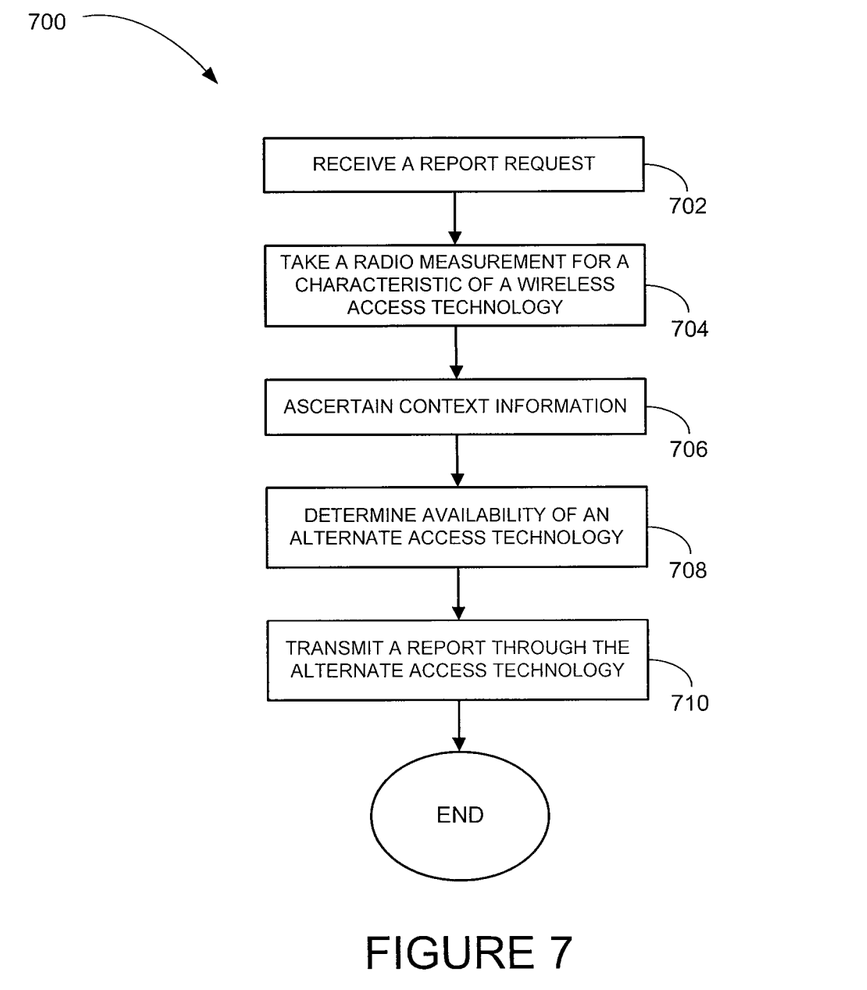
FIGS. 7 and 8 are flowcharts illustrating methods for report transmission, according to example embodiments.

FIG. 7 illustrates a method 700 for report transmission according to an example embodiment. The method 700 may be performed by the mobile electronic device 102 of the system 100 (see FIG. 1), or may be otherwise performed.

A report request may be received at block 702. The report may be received from the access point 106, the network manager 112, or the device manager 108. In one embodiment, the report request includes notification regarding availability of the alternate access technology. The notification may include a uniform resource locator (URL), a network name, or other information.

A radio measurement of a characteristic of the wireless access technology is taken at block 704. The taking of the radio measurement may be in response to receiving the report request. In one embodiment, the radio measurement of the characteristic of the wireless network 104 is an estimate of the performance of the wireless network 104 at a point in time.

In one embodiment, an occurrence of an event is determined and the taking of the radio measurement is made in response to the determination of the occurrence. The event may include a device event, a network event, or the like. The device event may be based on a certain time, entering in the range of a new wireless network, a certain amount of connection time with the wireless network 104, or the like. In one embodiment, the network event may be based on satellite or other network interference.

Context information on the taking of the radio measurement may be made at block 706. The context information may include, by way of example, a time stamp, device location information (e.g., a global positioning system (GPS) location), or the like.

Availability of the alternate access technology may be determined at block 708. In one embodiment, the availability is determined by attempting to discover the availability of the alternate access technology or the alternate network 105. In another embodiment, the availability is determined by receiving an indication of availability of the alternate access technology or the alternate network 105.

A report is transmitted through the alternate access technology at block 710. The report is based on the radio measurement, the context information, or both the radio measurement and the context information. The report may be a report response that is sent in response to the report request. The report request may include notification regarding availability of the alternate access technology. The report may be transmitted to the access point 106, the network manager 112, or the device manager 108.

The report may be transmitted through the alternate access technology as opposed to the wireless access technology for a variety of reasons. In one embodiment, the report is transmitted through the wireless access technology to the access point 106. A determination is then made as to whether the access point 106 or other intended recipients have received the report. The transmission of the report is then made through the alternate access technology based on a determination that the access point 106 or the other intended recipients have not received the report transmitted through the wireless access technology.

In another embodiment, data is transmitted to the access point 106 at a data rate through the wireless access technology. A determination is then made as to whether a transmission acknowledgement was received from the access point 106. The data rate is then reduced to a lower data rate based on the determination that the transmission acknowledgement was not received from the access point 106. When the lower date rate is below a floor rate, the transmission of the report is then made through the alternate access technology.

In another embodiment, the report transmission is made based on a determination to transmit the report through the alternate access technology as opposed to the wireless access technology. The determination to transmit through the alternate access technology may be made based on the respective costs of the wireless access technologies, the respective transmission speeds or quality of service of one or more of the access technologies, the availability of one or more of the access technologies, or may be otherwise made.

When supported by the mobile electronic device 102, the report may be transmitted from the mobile electronic device 102 in dual mode. That is, the transmission of the report through the alternate access technology is then performed while the wireless access technology is active on the mobile electronic device 102.

The report may be transmitted from the mobile electronic device 102 even when the mobile electronic device 102 is not in dual mode or does not support dual mode. For example, access to the wireless access technology is disabled and access to the alternate access technology is enabled. The transmission is then sent through the alternate access technology.

Figure 8:
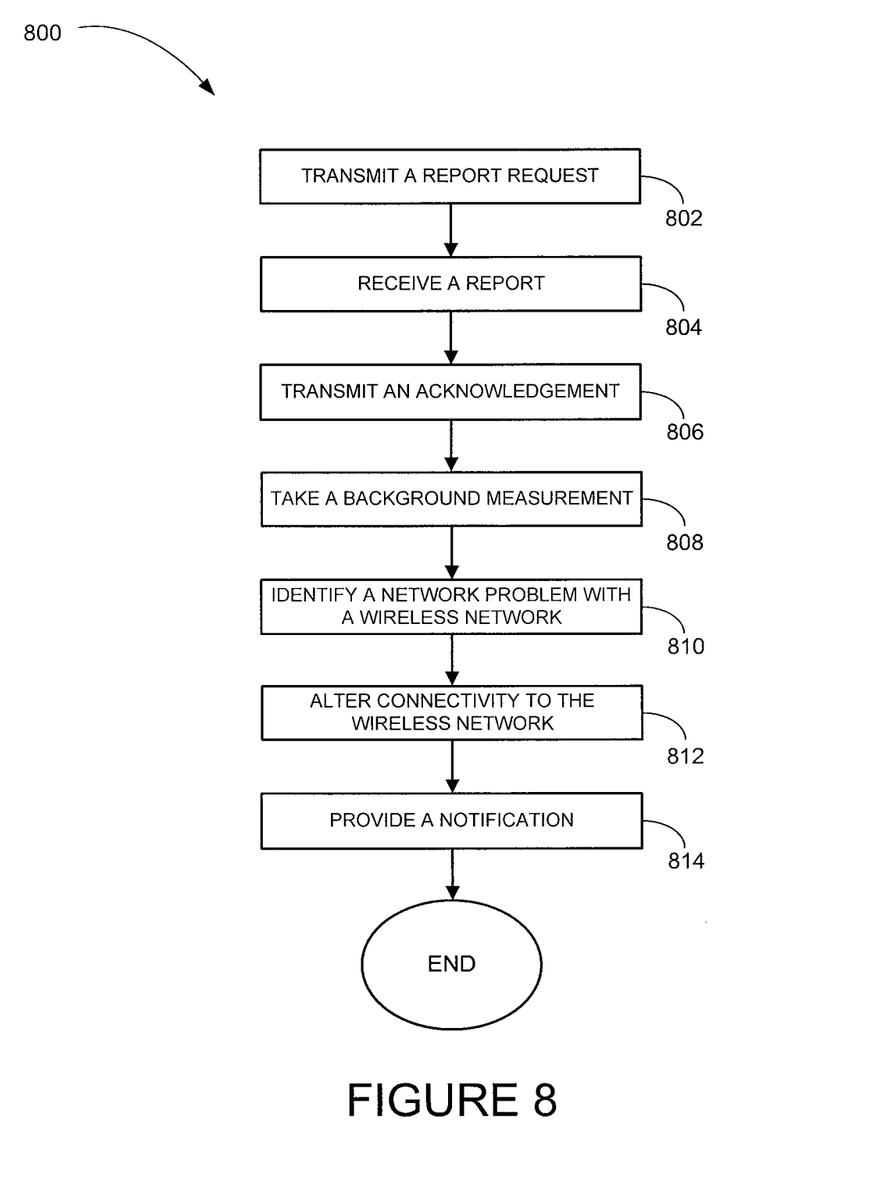

FIG. 8 illustrates a method 800 for report transmission according to an example embodiment. The method 800 may be performed by the access point 106 or the network manager 112 of the system 100 (see FIG. 1), or may be otherwise performed.

A report request is transmitted to the mobile electronic device 102 at block 802. At block 804, a report regarding the wireless access technology is received through the alternate access technology. The report may be received from the mobile electronic device 102 or the network manager 112. For example, the report may be received by the access point 106 from the network manager 112 or the mobile electronic device 102, or the report may be received by the network manager 112 from the access point 106 or the mobile electronic device 102. The report may be received from the mobile electronic device 102 in response to the report request. An acknowledgement may be transmitted to the mobile electronic device 102 at block 806 based on receipt of the report.

A background measurement of the wireless network 104 may be taken at block 808. The background measurement may, in one particular embodiment, detect the presence of a radar signal.

A network problem with the wireless network 104 is identified based on the report, the background measurement, or both at block 810. Example network problems include bad reception, microwave interference, unexpected walls, other wireless technologies, and the like.

Connectivity to the wireless network 104 through the wireless access technology is altered at block 812 based on identification of the network problem. The alteration of the connectivity may include, in one particular embodiment, optimizing performance of the wireless network 104. In another embodiment, the connectivity is altered by activating or adding one or more additional access points to the wireless network 104. In yet another embodiment, the transmit power of an access point associated with the wireless network (e.g., the access point 106, one or more of the additional access points, or both) may be increased or decreased.

A notification may be transmitted to the mobile electronic device 102, the additional mobile electronic devices, or both regarding the network problem at block 814.

Figure 9:
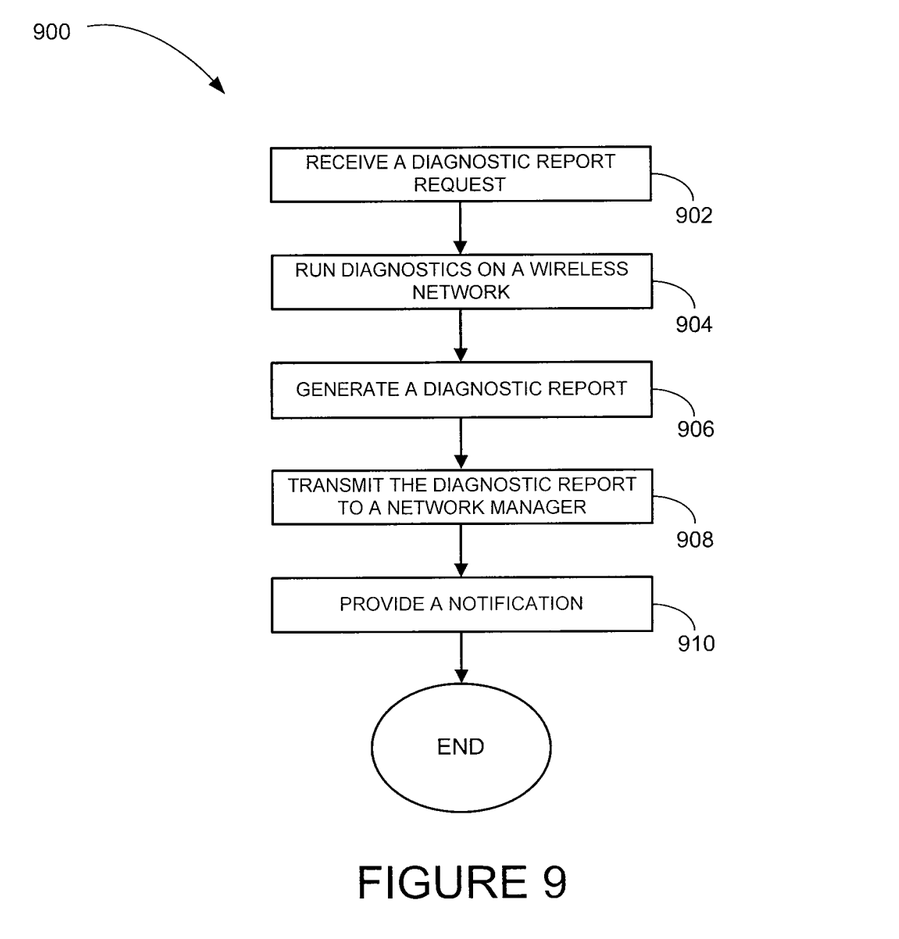
FIG. 9 is a flowchart illustrating a method for diagnostic reporting, according to an example embodiment.

FIG. 9 illustrates a method 900 for diagnostic reporting according to an example embodiment. The method 900 may be performed by the access point 106 or the device manager 108 of the system 100 (see FIG. 1), or may be otherwise performed.

A diagnostic report request may be received at block 902. Diagnostics are run on the wireless network 104 associated with the wireless access technology at block 904. The diagnostics may be run in response to receiving the diagnostic report request.

A diagnostic report is generated based on the running of the diagnostics at block 906. At block 908, the diagnostic report is transmitted to the network manager 112 associated with the wireless network 104 through the alternate access technology.

A notification may be transmitted at block 910 to the additional mobile electronic devices based on the running of the diagnostics.

Figure 10:
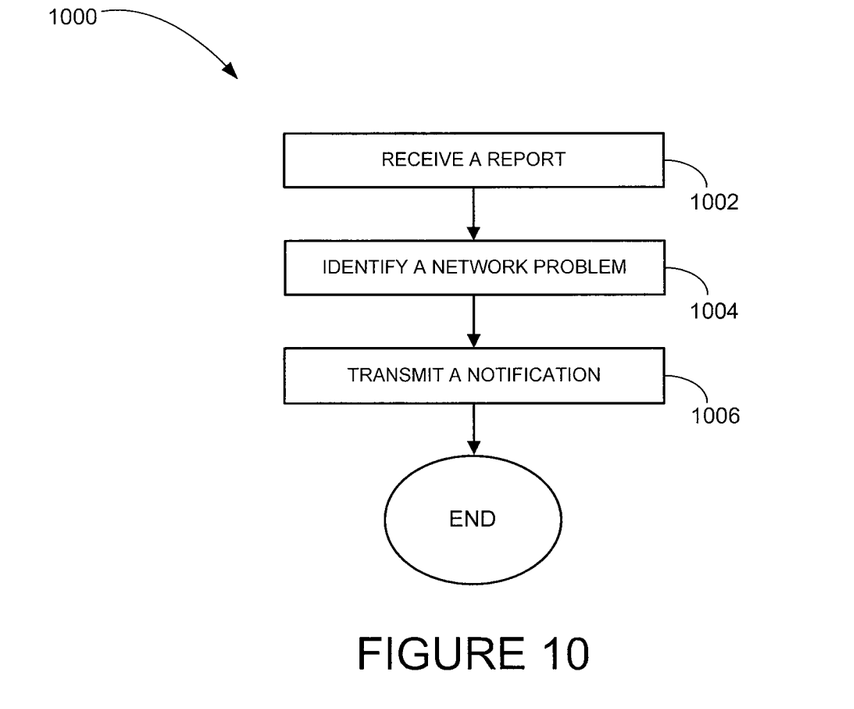
FIG. 10 is a flowchart illustrating a method for report notification, according to an example embodiment.

FIG. 10 illustrates a method 1000 for report notification according to an example embodiment. The method 1000 may be performed by the access point 106 or the device manager 108 of the system 100 (see FIG. 1), or may be otherwise performed.

A report is received at block 1002 from the mobile electronic device 102 regarding the wireless access technology through the alternate wireless access technology. A network problem may be identified in the wireless network 104 based on the report at block 1004.

At block 1006, a notification is transmitted to the additional mobile electronic devices based on the report, the network problem, or both. In one embodiment, the notification includes a low network priority for the wireless network 104 associated with the wireless access technology. The notification is transmitted through the wireless access technology, the alternate access technology, or a different access technology.

Figure 11:
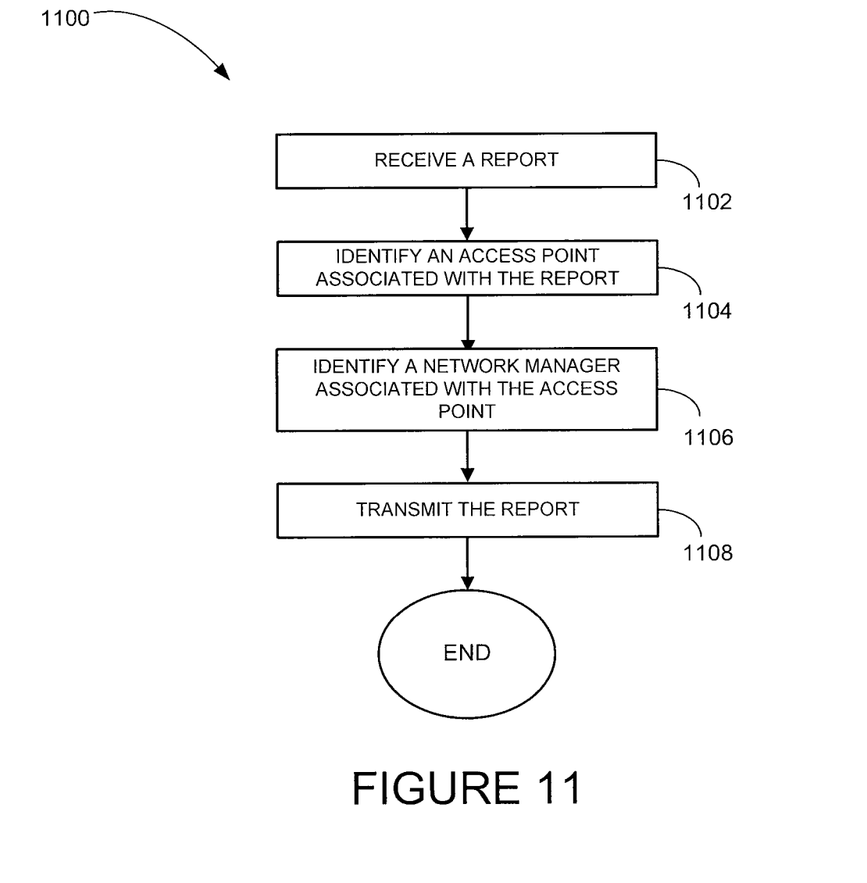
FIG. 11 is a flowchart illustrating a method for report retransmission, according to an example embodiment.

FIG. 11 illustrates a method 1100 for report retransmission according to an example embodiment. The method 1100 may be performed by the device manager 108 of the system 100 (see FIG. 1), or may be otherwise performed.

A report is received at block 1102 from the mobile electronic device 102 regarding a wireless access technology through the alternate access technology.

The access point 106 associated with the report is identified at block 1104. The network manager 112 associated with the access point 106 may be identified at block 1106.

The report is transmitted at block 1108 based on identification of the access point 106, the network manager 112, or both the access point 106 and the network manager 112. The report is transmitted to the access point 106 or the network manager 112. The report may be transmitted through a data tunnel, or may be otherwise transmitted.

Certain systems, apparatus, applications or processes are described herein as including a number of modules. A module may be a unit of distinct functionality that may be presented in software, hardware, or combinations thereof. When the functionality of a module is performed in any part through software, the module includes a machine readable medium. The modules may be regarded as being communicatively coupled.

The inventive subject matter may be represented in a variety of different embodiment of which there are many possible permutations.

In an example embodiment, a radio measurement of a characteristic of a wireless access technology may be taken. The wireless access technology may enable data communication through a wireless network when connected to an access point. A report may be transmitted through an alternate access technology. The report may be based on the radio measurement.

In an example embodiment, a report regarding a wireless access technology may be received through an alternate access technology. A network problem may be identified with a wireless network based on the report. Connectivity to the wireless network through the wireless access technology may be altered based on identification of the network problem.

In an example embodiment, diagnostics may be run on a wireless network associated with a wireless access technology. A diagnostic report may be generated based on the running of the diagnostics. The diagnostic report may be transmitted to a network manager associated with the wireless network through an alternate access technology.

In an example embodiment, a report may be received from a mobile electronic device regarding a wireless access technology through an alternate access technology. A notification may be transmitted to a plurality of additional mobile electronic devices based on the report.

In an example embodiment, a report may be received from a mobile electronic device regarding a wireless access technology through an alternate access technology. An access point associated with the report may be identified. The access point may be associated with the wireless access technology. The report may be transmitted based on identification of the access point.

Methods and systems for wireless network management have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

What is claimed is:

1. A method comprising:
generating, at a wireless device, a report associated with a wireless local area network (WLAN), the WLAN being associated with an access point configured to provide WLAN connectivity to the wireless device wherein the report is generated in response to a diagnostic report request received from the access point and the diagnostic report request includes a notification element including a uniform resource locator (URL) associated with an alternate access technology; and transmitting the report via a wired connection using the URL from the wireless device to the access point configured to provide WLAN connectivity to the wireless device.

2. The method of claim 1, wherein the report is transmitted through the wired connection based on a loss of connectivity through the WLAN.

3. The method of claim 1, further comprising:
determining an availability of the wired connection prior to transmission of the report.

4. The method of claim 1, wherein the report is transmitted, to the access point, using the URL.

5. The method of claim 1, wherein the transmitting the report further comprises:
transmitting, via the access point, the report to a network manager.

6. The method of claim 1, wherein the transmitting the report further comprises:
transmitting, via the access point, the report to a recipient.

7. The method of claim 1, further comprising using the report to diagnose a network problem.

8. The method of claim 1, wherein the report is further based on context information.

9. The method of claim 8, wherein the context information includes at least one of a time stamp and device location information.

10. The method of claim 1, wherein the access point that is configured to provide WLAN connectivity to the wireless device takes one or more background measurements of the wireless local area network and identifies a network problem based on the one or more background measurements.

11. A method comprising: receiving, at an access point configured to provide network connectivity to a wireless device, a report regarding a wireless access technology, the reporting being transmitted via a wired connection to the access point configured to provide network connectivity to the wireless device wherein the report is received in response to a diagnostic report request sent from the access point to the wireless device and the diagnostic report request includes a notification element including a uniform resource locator (URL) associated with an alternate access technology and the report is sent by the wireless device using the URL;

identifying by the access point, a network problem based on the report; and     altering by the access point, connectivity through the wireless access technology based on identification of the network problem.

12. The method of claim 11, further comprising:

transmitting a notification to at least one mobile electronic device regarding the network problem.

13. The method of claim 11 wherein the report is based on context information.

14. The method of claim 11, wherein the altering of the connectivity comprises:

altering transmit power of the access point based on identification of the network problem.

15. A wireless device comprising:

a processor configured to:

generate a report associated with a wireless local area network (WLAN), the WLAN being associated with an access point configured to provide WLAN connectivity to the wireless device wherein the report is generated in response to a diagnostic report request received from the access point and the diagnostic report request includes a notification element including a uniform resource locator (URL) associated with an alternate access technology; and     transmit the report via a wired connection using the URL from the wireless device to the access point configured to provide WLAN connectivity to the wireless device.

16. The wireless device of claim 15, wherein the processor is further configured to receive a report request from the access point.

17. The wireless device of claim 16 wherein the processor is further configured to generate the report in response to the report request.

18. The wireless device of claim 15, wherein the processor is further configured to determine an availability of the wired connection prior to transmission of the report.

19. The wireless device of claim 15 wherein the processor is configured to transmit the report to the access point using the URL.

20. The wireless device of claim 15 wherein the report is based on context information.

* * * * *